United States Patent
Bunyard

(10) Patent No.: US 7,131,631 B2
(45) Date of Patent: Nov. 7, 2006

(54) ACTUATOR CONTROL DEVICE

(75) Inventor: Adam Bunyard, Brighton (GB)

(73) Assignee: Forac Limited, Shoreham-by-Sea (GB)

( * ) Notice: Subject to any disclaimer, the term of this patent is extended or adjusted under 35 U.S.C. 154(b) by 56 days.

(21) Appl. No.: 10/526,462

(22) PCT Filed: Sep. 3, 2003

(86) PCT No.: PCT/GB03/03872

§ 371 (c)(1),
(2), (4) Date: Mar. 3, 2005

(87) PCT Pub. No.: WO2004/023227

PCT Pub. Date: Mar. 18, 2004

(65) Prior Publication Data
US 2006/0163510 A1    Jul. 27, 2006

(30) Foreign Application Priority Data
Sep. 4, 2002   (GB)  ................................ 0220564.9

(51) Int. Cl.
*G05B 19/04*    (2006.01)

(52) U.S. Cl. .................................................. 251/129.15
(58) Field of Classification Search ............ 251/129.15
See application file for complete search history.

(56) References Cited

U.S. PATENT DOCUMENTS

| | | |
|---|---|---|
| 3,731,176 A | 5/1973 | Mitchell et al. |
| 4,450,753 A * | 5/1984 | Basrai et al. .................. 91/35 |
| 2002/0005501 A1 | 1/2002 | Hilaire |

FOREIGN PATENT DOCUMENTS

EP    0 040 075 A1    11/1981

* cited by examiner

Primary Examiner—J. Casimer Jacyna
(74) Attorney, Agent, or Firm—Diller, Ramik & Wight

(57) ABSTRACT

A valve actuator control device adapted to control the position of a valve actuator by means of solenoid valves, in which if the actuator position deviates from a desired position, but remains within a predetermined distance from said desired position, the control device is adapted to only return the actuator to the desired position after a delay period, thereby to increase the life span of said solenoid valves.

9 Claims, 1 Drawing Sheet

ACTUATOR CONTROL DEVICE

BACKGROUND OF THE INVENTION

This invention relates to an actuator control device for use in particular, but not exclusively, with a pneumatic actuator.

Pneumatic actuators are used to activate valves which control the flow of a substance through a pipe or the like. These actuators may be positioned by means of a control device provided with solenoid valves. Many re-adjustments may be required to obtain a desired valve position, in particular if the desired position is not constant.

A typical electrically operated on/off solenoid valve has a life of approximately 50 million operations. In applications where the flow valves need to be constantly moved, the solenoid valves can expire in less than 12 months.

There are alternative mechanical ways of operating an actuator, however these are more expensive to manufacture and to purchase than those provided with the above described solenoid valves.

The present invention is intended to overcome some of the above problems.

SUMMARY OF THE INVENTION

According to the present invention an actuator control device is adapted to delay actuator movement towards a desired position if the actuator's actual position is within a predetermined distance therefrom.

Preferably the control device can delay actuator movement for a number of different predetermined time periods, which correspond to a number of sequential predetermined distances away from the actuator's desired position.

In one construction the predetermined delay periods decrease the further away from the desired position the actuator is. Therefore, if the actuator is a long way from its desired position there will be a small, or no, delay before the actuator is moved, however, if the actuator is very near to its desired position there will be a long delay before the actuator is moved.

The actuator can also be provided with two input signals, the first being the desired actuator position, and the second being the actual actuator position. The desired actuator position can be set via a control means accessible by the system operator. Alternatively, the desired position can be sent from another part of the plumbing of the system with which the actuator and valve is used, for example an active pressure monitoring means downstream of the flow valve. The actual actuator position can be provided by a potentiometer of a known construction.

The sequential predetermined distances can each be 0.7 degrees wide. The desired actuator position can be a 0.7 degrees wide band, which is provided with four further 0.7 degree bands on either side.

The predetermined delay periods can be 13 seconds in the first band outside the desired band, then 7 seconds, 4 seconds and 2 seconds. Therefore, when the actual actuator position is between 0.1 degrees and 0.7 degrees outside the desired 0.7 degree wide band, according to the difference between the two input signals, the control device will not move the actuator for 13 seconds. When the actuator is between 0.8 degrees and 1.4 degrees from the desired band, the delay is 7 seconds, and so on.

If the actuator's actual position changes to a different 0.7 degrees band during the delay period, the control device can be adapted to modify the delay period to correspond to the new position.

Therefore, if the actuator is positioned according to a 7 seconds delay, but moves after 5 seconds to the 13 seconds delay band, the actuator will operate after a further 8 seconds. However, if the actuator is positioned according to a 7 seconds delay, and moves after 5 seconds to the 4 seconds delay band, the actuator will operate immediately, because more than 4 seconds have elapsed.

With this arrangement actuator movements which may not be effective due to the actuator's constantly changing position are not made.

In one construction the actuator is provided with solenoid-valves. The actuator can be a "spring return" actuator of any known type, in which the position of the actuator is controlled by an inlet solenoid valve and an exhaust solenoid valve which control a force which acts against a return force, for example a spring. In an alternative construction the actuator can be a "double acting" actuator of any known type, in which the position of the actuator is controlled by a number of solenoid valves adapted to control a force and a return force.

The actuator can be used to control a flow valve, the position of which may need to be constantly changed to maintain a constant output flow.

The present invention can be performed in various ways, but one embodiment will now be described by way of example, and with reference to the accompanying drawing, in which:

DETAILED DESCRIPTION OF THE PREFERRED EMBODIMENTS

Figure 1:
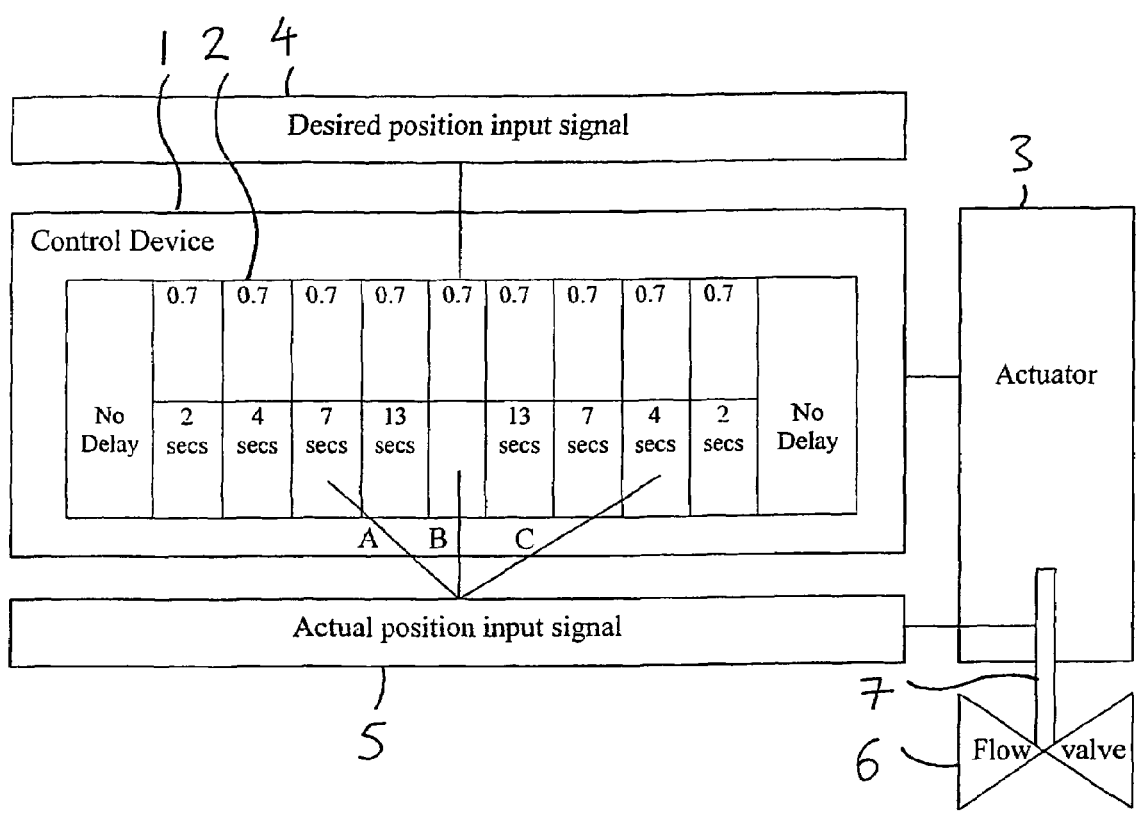
FIG. 1 is a diagram displaying the features of an actuator control device according to the present invention.

In FIG. 1 an actuator control device 1 is provided with an electronic program 2 which is adapted to delay the movement of a spring return actuator 3 to a desired position when the actuator's 3 actual position is within a predetermined distance from the desired position.

The control device 1 is connected to the actuator 3, which is connected to a flow valve 6.

The control device 1 is provided with a desired position input signal 4, and an actual position input signal 5. The actual position input signal 5 is drawn from the actual position of the valve stem 7 inside the actuator.

FIG. 1 shows three potential actual position input signals, A, B, and C.

In use the system operator, or an active pressure monitoring means downstream of the flow valve, provides a Desired position input signal 4. The Control device 1 then moves the actuator to that desired position, at which point the control device begins a timer.

If the actuator changes position by 1 degree, actual position input signal A is fed into the control device 1.

If after seven seconds the input signal A remains in the same 0.7 degrees wide band between 0.8 degrees and 1.4 degrees, the control device 1 will operate the actuator 3 and attempt to move it back in line with the desired position input signal 4.

However, if the input signal 5 changes to position B in less than 7 seconds, the actuator 3 is not moved by the control device 2, as the movement is no longer necessary.

In the event that the input signal 5 changes to another position outside the desired 0.7 degrees band in less than 7 seconds the actuator will operate according to the delay period corresponding to the new position. So, for example, if the actuator moves after 5 seconds to position C the actuator will operate immediately because more than 4 seconds have passed.

In the event that the input signal 5 is outside all of the nine 0.7 degree wide bands, there is no delay in operating the actuator 3.

Therefore, the control device operates the actuator, and the actuator's solenoid valves, far less than in a conventional arrangement.

It will be appreciated that the predetermined distances and delay periods can be any desired amount, and are not restricted to those shown in FIG. 1.

Further, it will be appreciated that the present invention can also be used to control a double acting actuator provided with inlet solenoid valves and exhaust solenoid valves. A single control device can be adapted to control these valves, operating a combination to move the actuator in one direction, and another combination to move it in the opposite direction.

It has been found that with the above program of delay sequences, the life time of a typical solenoid valve in an actuator is extended by over 10 times. It has been further found that the delay system incorporated into the above described system does not effect the flow of the substance through the flow valve to any appreciable extent Therefore an actuator control device is provided which uses inexpensive solenoid valves whilst giving long life and good control.

Although a preferred embodiment of the invention has been specifically illustrated and described herein, it is to be understood that minor variations may be made in the apparatus without departing from the spirit and scope of the invention, as defined by the appended claims.

The invention claimed is:

1. A valve actuator control device adapted to control the position of a valve actuator by means of solenoid valves, in which if the actuator position deviates from a desired position, but remains within a predetermined distance from said desired position, the control device is adapted to only return the actuator to the desired position after a delay period, thereby to increase the life span of said solenoid valves, in which the predetermined distance is divided into a number of sections, and in which a different delay period is applied when the actuator is positioned in each section.

2. A valve actuator control device as claimed in claim 1 in which the control device comprises an electronic program adapted to control the position of a valve actuator.

3. A valve actuator control device as claimed in claim 1 in which the delay periods decrease in duration as the distance between the desired position and the actuator position increases in size.

4. A valve actuator control device as claimed in claim 3 in which the valve actuator provides a rotational movement, and in which the desired position is a point or a section in the actuator's range of rotational movement, and each section of the predetermined distance is a band of rotational movement in either direction from the desired position.

5. A valve actuator control device as claimed in claim 4 in which the desired position is a 0.7 degree wide band within the actuator's range of rotational movement, and each section of the predetermined distance is a 0.7 degree wide band, and in which the predetermined distance is divided into four 0.7 degree wide bands.

6. A valve actuator control device as claimed in claim 5 in which the control device is adapted to delay movement of the actuator to the desired position for thirteen seconds when the actuator is positioned in the first 0.7 degree wide band outside the desired position, for seven seconds in the second band, for four seconds in the third band and for two seconds in the fourth band, and in which when the actuator is positioned outside the predetermined distance there is no delay in movement of the actuator to the desired position.

7. A valve actuator control device as claimed in claim 6 in which if the actuator position changes from a first band to a second band, and a first delay period changes to a second delay period, the time which elapsed during the first delay period is subtracted from the second delay period.

8. A valve actuator control device as claimed in claim 1 in which the desired position is set via a control means accessible by an operator of the valve actuator, and/or an active pressure monitoring means downstream of a flow valve which is controlled by said actuator.

9. A valve actuator control device as claimed in claim 1 in which a potentiometer connected to a valve stem extending from the flow valve provides the actuator position to the control device.

* * * * *